(12) United States Patent
Arias

(10) Patent No.: US 10,963,892 B2
(45) Date of Patent: Mar. 30, 2021

(54) METHODS AND SYSTEMS FOR CREATING A LOCATION-BASED INFORMATION SHARING PLATFORM

(71) Applicant: Micro, LLC, Philadelphia, PA (US)

(72) Inventor: Jeff W. Arias, Philadelphia, PA (US)

(73) Assignee: Micro, LLC, Philadelphia, PA (US)

( * ) Notice: Subject to any disclaimer, the term of this patent is extended or adjusted under 35 U.S.C. 154(b) by 0 days.

(21) Appl. No.: 16/938,172

(22) Filed: Jul. 24, 2020

(65) Prior Publication Data

US 2021/0027311 A1 Jan. 28, 2021

Related U.S. Application Data

(60) Provisional application No. 62/878,169, filed on Jul. 24, 2019.

(51) Int. Cl.
*H04W 4/02* (2018.01)
*G06Q 30/02* (2012.01)
*H04L 29/08* (2006.01)
*H04W 4/029* (2018.01)

(52) U.S. Cl.
CPC ............ *G06Q 30/02* (2013.01); *H04L 67/18* (2013.01); *H04W 4/029* (2018.02)

(58) Field of Classification Search
CPC ............ H04W 4/029; G06Q 30/0205; G06Q 30/0206; G06Q 40/02; G06Q 40/04
See application file for complete search history.

(56) References Cited

U.S. PATENT DOCUMENTS

| | | | |
|---|---|---|---|
| 7,187,997 B2 * | 3/2007 | Johnson | G06Q 30/0277 700/245 |
| 7,370,085 B2 | 5/2008 | Brown et al. | |
| 7,660,872 B2 | 2/2010 | Delia et al. | |
| 8,086,246 B2 | 12/2011 | Brown et al. | |
| 8,095,151 B2 | 1/2012 | Kall et al. | |
| 8,554,765 B2 | 10/2013 | Singh et al. | |
| 8,855,681 B1 * | 10/2014 | George | H04W 4/029 455/456.3 |
| 9,649,554 B1 | 5/2017 | Akpan et al. | |

* cited by examiner

*Primary Examiner* — Michael T Vu
(74) *Attorney, Agent, or Firm* — Kanika Radhakrishnan; Evergreen Valley Law Group

(57) ABSTRACT

Methods and systems for creating a location-based information sharing platform are described. The method includes receiving location coordinates of a location of a user. The method includes computing great-circle distances between a plurality of points and the location coordinates using a mathematical formula. The plurality of points represents location coordinates of items of interests near the location of the user. The method includes determining a range information of the location of the user based at least on the computed great-circle distances. The range information includes a plurality of range coordinates. The method includes querying a content database based on the plurality of range coordinates to retrieve information lying within the plurality of range coordinates from available data in the content database. The method further includes facilitating access of the retrieved information to the user.

20 Claims, 10 Drawing Sheets

METHODS AND SYSTEMS FOR CREATING A LOCATION-BASED INFORMATION SHARING PLATFORM

TECHNICAL FIELD

Embodiments of the disclosure relate generally to a field of information sharing and, more particularly to, methods and systems for creating a location-based information sharing platform.

BACKGROUND

Wireless communication technologies and mobile terminals that have a GPS (Global Positioning System) or other location determination technology have advanced rapidly over the past few years. As a result, there is a growing demand for location-based information services that offer information related to a user's current locality. To keep in pace with this demand, mobile terminals have become more powerful and dynamic by including several components, for instance, GPS receivers, sensors, personal digital assistant (PDA) capabilities, cameras to capture video and still images, Internet access and so on. However, despite these advancements, mobile terminals lack in their ability to provide effective location-based services, information, or communications.

Location-based services have been developed for determining and tracking the locations of the users of mobile devices. A few examples of location-based information include listings of events and sites of interest. A user who wishes to obtain this information would need to search the Internet, visit the local tourism office or consult a travel guide or a local newspaper. However, these approaches require the user to actively search for a resource that can be time-consuming. Another drawback is that outdated information that is of little interest to the user may be provided.

In addition to providing location-based information only to the user, the sharing of location-based information may also provide benefits. However, there are specific instances in which sharing location information is of significant value. For instance, letting friends and other family members know a user's location can be important for safety and coordination reasons. Also, sharing information with certain providers of products and services in user-defined circumstances may provide value as well. However, for privacy reasons, the users may not want to share their location information at all times thereby limiting the sharing of such information. Thus, there exists a need in the art for systems and methods of sharing location-based and other user information, while filtering access to that information.

Mobile terminals are now capable of receiving content from various types of network devices and presenting the content to users in a visual or audible format. Users may browse the Internet and receive various types of content. Users are interested in obtaining this content but are primarily interested in obtaining information/content that is deemed beneficial. Several information services provide information based on the user's location. However, these information services do not provide a user-friendly way to identify user locations. Further, the information services/content providers do not usually know what information the user wants at a particular time and location. A few services push information to the mobile terminals based on the assumption that the users are at locations where the information is useful. However, a large percentage of this information is not useful to the users. So, this unwanted information can flood mobile devices and consume bandwidth, memory, and battery power.

In light of the above discussion, there is a need for methods and systems that provide location-specific content to the mobile terminals associated with users in an efficient and user-friendly manner.

SUMMARY

Various embodiments of the present disclosure provide methods and systems for creating a location-based information sharing platform.

In an embodiment, a method is disclosed. The method includes receiving location coordinates of a location of a user. The method includes computing great-circle distances between a plurality of points and the location coordinates using a mathematical formula. The plurality of points represents location coordinates of items of interests nearby the location of the user. The method includes determining a range information of the location of the user based at least on the computed great-circle distances. The range information includes a plurality of range coordinates. The method includes querying a content database based on the plurality of range coordinates to retrieve information lying within the plurality of range coordinates from available data in the content database. The method further includes facilitating access of the retrieved information to the user.

In another embodiment, a server system is disclosed. The server system includes a memory to store instructions and a processor to execute the stored instructions in the memory and thereby causing the server system to receive location coordinates of a location of a user. The server system is further configured to compute great-circle distances between a plurality of points and the location coordinates using a mathematical formula. The plurality of points represents location coordinates of items of interests nearby the location of the user. The server system is further configured to determine a range information of the location of the user based at least on the computed great-circle distances. The range information includes a plurality of range coordinates. The server system is further configured to query a content database based on the plurality of range coordinates to retrieve information lying within the plurality of range coordinates from available data in the content database. The server system is further configured to facilitate access of the retrieved information to the user.

In yet another embodiment, a system is disclosed. The system includes a content database, a user interface (UI) module, a great-circle distance calculation module, a location range determination module, an information generation and management module and a processing module. The content database is configured to store data regarding items of interest in a categorized manner. The UI module is in communication with the content database. The UI module is configured to present one or more UIs for facilitating information sharing based on a location of a user. The great-circle distance calculation module is in communication with the UI module. The great-circle distance calculation module is configured to calculate great-circle distances between a plurality of points and the location of the user. The location range determination module is in communication with the great-circle distance calculation module and the UI module. The location range determination module is configured to determine range of the location of the user based on the calculated great-circle distances. The information generation and management module is in communication with the location range determination module and the content database. The information generation and management module is configured to query the content database based on the determined range of the location to retrieve information lying within the range of the location in the content database. The processing module is in communication with the information generation and management module, the location range determination module, the great-circle distance calculation module, the UI module and the content database. The processing module is configured to send operating instructions to the information generation and management module, the location range determination module, the great-circle distance calculation module, the UI module and the content database for facilitating information sharing based on the location of the user.

BRIEF DESCRIPTION OF THE FIGURES

For a more complete understanding of example embodiments of the present technology, reference is now made to the following descriptions taken in connection with the accompanying drawings in which.

Figure 1:
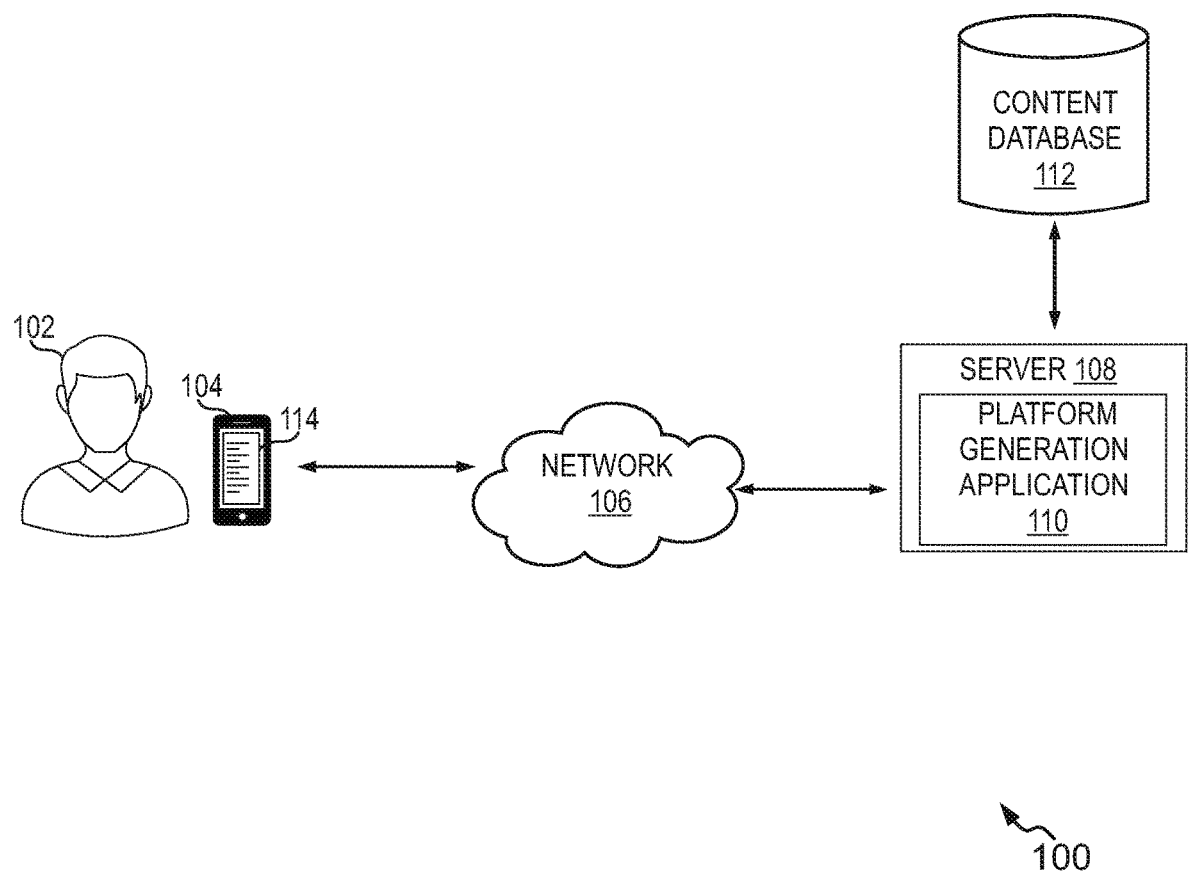
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for creating a location-based information sharing platform.

A platform generation application is provided for facilitating the creation of a location-based information sharing platform. The platform generation application provides User Interfaces (UI's) that facilitates information sharing based on a location of a user.

The platform generation application first receives location coordinates of a current geographic location of a user from an electronic device associated with the user and then computes great-circle distances between a plurality of points and the location coordinates using a mathematical formula. The plurality of points represents location coordinates of items of interest nearby the location of the user. The computed great-circle distances are then utilized to determine range information for the location of the user. The range information may include a plurality of range coordinates that can lie on earth in different directions from the location of the user.

The platform generation application may further send a query to a content database using the plurality of range coordinates to retrieve information lying within the plurality of range coordinates from available data in the content database. The content database is populated with data regarding items of interest, such as job openings, news, event information, etc., along with their location coordinates. The content database can receive preferences and location information to generate categorical information as output.

Once the information is retrieved, the retrieved information is presented to the user on the electronic device. The information presented to the user is specifically related only to the geographic location of the electronic device. The information includes, but is not limited to, news and crime reports in the area, sales and advertisements, job openings, historical information, live or recorded videos associated fun events, and public reviews.

Further, if the user moves away from the obtained geographic location, then a new set of coordinates is received from the electronic device. The process of using the mathematical formula and querying the database is performed again to deliver updated information to the user (specific to the new set of location coordinates).

The terms 'great-circle distance' and 'orthodromic distance' have been used interchangeably throughout the description and refer to the shortest distance between two points on a surface of a sphere, such as earth.

FIG. 1 is an illustration of an environment 100 related to at least some example embodiments of the present disclosure. The environment 100 includes, but is not limited to, a wireless communication network (e.g., a network 106) that connects entities such as a user 102 and a server 108. The user 102 is depicted to be associated with an electronic device 104 (hereinafter referred to as 'user device 104'). It should be noted that one user is shown for the sake of simplicity to explain the present disclosure, and in an application, there can be many such users.

The user device 104 is equipped with a platform generation application 110 that facilitates the creation and management of a location-based information sharing platform. The user device 104 may be any communication device having hardware components for enabling User Interfaces (UIs) of the platform generation application 110 to be presented on the user device 104. The user device 104 may be capable of being connected to the wireless communication network (such as the network 106). Examples of the user device 104 include, but are not limited to, a mobile phone, a smart telephone, a computer, a laptop, a Personal Digital Assistant (PDA), a Mobile Internet Device (MID), a tablet computer, an Ultra-Mobile personal computer (UMPC), a phablet computer, a handheld personal computer, Internet of Things (IoT) devices, such as smart televisions, smart speakers, smart home appliances, smart mirrors, smart sensors and the like.

The user device 104 is preferably a wireless device that can accept input and provide output to the user 102 in various forms. For instance, the user device 104 can accept keypad presses, spoken word(s) and/or direct electronic data as the input. Likewise, the output may be text messages, icons, pictograms, video and/or audio. In a preferred embodiment, the user device 104 supports a wireless application protocol (WAP). However, it should be noted that the methods and systems described herein work with wireless and/or wired devices that support WAP or other protocols. In an embodiment, the user device 104 is a wired device that is capable of being connected to the network 106 using Ethernet and/or coaxial cables.

In at least one example embodiment, the user 102 may access the platform generation application 110 for viewing information specifically related to the current geographic location of the user 102. The information includes, but are not limited to, historical information regarding the location, crime reports and news, sales and promotions by local businesses, advertisements by corporations, job openings and requirements in a range of the location, dining experiences and reviews of eateries in the range of the location, details of events happening in the range of the location, and photos and videos/live videos of the events. The user 102 may also access the platform generation application 110 to search for data that is relevant to the user 102 by placing a search query. Further, the user 102 may access the platform generation application 110 for creating a post to share information associated with the current location of the user. The post can be about the user 102 looking for a job in nearby locations, or the user 102 looking to hire in the location, or the user 102 may simply want to share information about a night event that the user 102 has enjoyed in the location and so on. Additionally, the user 102 may access the platform generation application 110 for providing profile information associated with the user 102.

The server 108 provides a software application, herein referred to as the platform generation application 110, in response to the request received from the user device 104 via the network 106. Examples of the network 106 include stand-alone or a combination of a local area network (LAN), a wide area network (WAN), virtual LAN (VLAN), personal area network (PAN), wireless, wired, any currently existing or to be developed network that can be used for communication. More specifically, an example of the network 106 can be the Internet which may be a combination of a plurality of networks. The network 106 can be operable with cellular networks, Bluetooth network, Wi-Fi networks, or any other networks or combination thereof. The network 106 may also include a gateway (not shown in FIG. 1) that is coupled between a base station (not shown in FIG. 1) and the network 106.

In some embodiments, the platform generation application 110 may be factory-installed on the user device 104 and the user 102 may not need to specifically request the platform generation application 110 from the server 108. In a preferred embodiment, the server 108 is a cloud server using cloud server technology.

In an embodiment, the server 108 is in communication with a content database 112. The content database 112 is populated with data regarding items of interest, such as news, historical information, events etc., along with their location coordinates. It should be noted that the data stored in the content database 112 is categorized data i.e. data is stored under a plurality of category tags. The plurality of category tags may further include a plurality of sub-category tags. Initially, some of the category tags are already defined in the content database 112. The category tags and the sub-category tags can also be created by some registered users and businesses or by local and state law enforcement. In an embodiment, the category tags represent a set of general categories that most of the tags can be compartmentalized into. The sub-category tags may be defined once a general category is determined for the data. For example, entertainment can be a category tag in which the sub-category tags, such as movies, events, and plays can lie.

In at least one example embodiment, the platform generation application 110 is configured to receive location coordinates of a current location of the user 102 from the user device 104 using the network 106. The platform generation application 110 may take necessary permissions from the user 102 to obtain location coordinates of the current location of the user 102 from the user device 104. The user device 104 is assumed to be operating in an area that has network coverage and is equipped with necessary hardware and/or software that are required for tracking the current location of the user 102. The platform generation application 110 is then configured to compute great-circle distances/orthodromic distances between a plurality of points that are available on a sphere (e.g., earth) and the location coordinates of the user 102 using a mathematical formula. In an embodiment, the mathematical formula that is being used to calculate great-circle distances is a haversine formula. The plurality of points may represent location coordinates of items of interests near the current location of the user 102. For example, restaurants operating near the location of the user 102, events happening near the location of the user 102, location coordinates of the job openings near the location of the user 102 etc., may be considered as some points and the orthodromic distance between each point and the location coordinates of the user 102 are calculated. In a non-limiting example, the great-circle distance can be understood as the shortest distance between two points on the surface of the sphere and is measured along the surface of the sphere opposed to a straight line through the interior of the sphere. As there are no straight lines on the sphere, the straight lines are replaced by geodesics. Geodesics on the sphere are circles on the sphere whose centers coincide with the center of the sphere, and are called great circles. As the shape of the earth is also nearly spherical, the haversine formula of great-circle distance calculation is used to calculate the distance between the location of the user device 104 and the plurality of points i.e. location of items of interests. In an embodiment, the haversine formula is preferred over other formulas, such as Vincenty's formulae as the haversine formula re-formulates the spherical law of cosines and works better with smaller angles and distances. The haversine formula also demands less computation power than any other formulas.

Further, the platform generation application 110 is configured to determine range information of the current location of the user based on the computed great-circle distances. The range information includes a plurality of range coordinates that are located on the sphere. In an embodiment, the calculated great-circle distances between the plurality of points may vary i.e. some can be very near the location of the user device 104 and some can be very far from the location of the user device 104. So, a median distance is calculated from the calculated great-circle distances and the calculated median distance is used as the range information for the location of the user device. The range information is then used as a radius from the location of the user device and a plurality of coordinates that are lying on a circumference of a circle created using the radius from the location of the user device are considered as the plurality of range coordinates.

Once the range information for the current location of the user 102 is available, the platform generation application 110 may query the content database 112 based on the plurality of range coordinates to retrieve information lying within the plurality of range coordinates from the data available in the content database 112. The data specific to values of the range coordinates is retrieved from the content database 112 and is presented to the user 102 on a user interface 114 presented on the user device 104.

The information presented to the user 102 is specifically related only to the current location of the user device 104. The information includes, but is not limited to, news and crime reports in the area, sales and advertisements, job openings, historical information, live feeds and/or videos of some fun events, public reviews etc.

Additionally, the platform generation application 110 is configured to continuously track the change in the location coordinates of the user device 104 associated with the user 102. If any change is detected in the location coordinates, then the platform generation application 110 may again calculate the new great-circle distances between a plurality of new points and new location coordinates using the mathematical formula. The new great-circle distances may then be used by the platform generation application 110 to determine new range information of the new location of the user 102. The new range information may include a plurality of new range coordinates. The platform generation application 110 may then query the content database 112 based on the plurality of new range coordinates to determine new information lying within the plurality of new range coordinates from available data in the content database 112. The new information is then presented on the user device 104 of the user 102.

In at least one example embodiment, the platform generation application 110 is configured to store the profile information provided by the user 102 in the content database 112. The platform generation application 110 is also configured to maintain search history for the user 102 based on one or more search queries received from the user 102. Further, the platform generation application 110 is configured to generate post recommendations for the user 102 based, at least on, the profile information and the search history maintained for the user 102. The generated post recommendations are then displayed to the user along with the information/new information.

The platform generation application 110 is an application resting at the server 108. In an embodiment, the server 108 is configured to manage the platform generation application 110 and communicate with devices, such as the user device 104 using the network 106. The platform generation application 110 may be accessed through the web via the network 106. In an embodiment, the platform generation application 110 may be accessed through the web using Internet.

Figure 9:
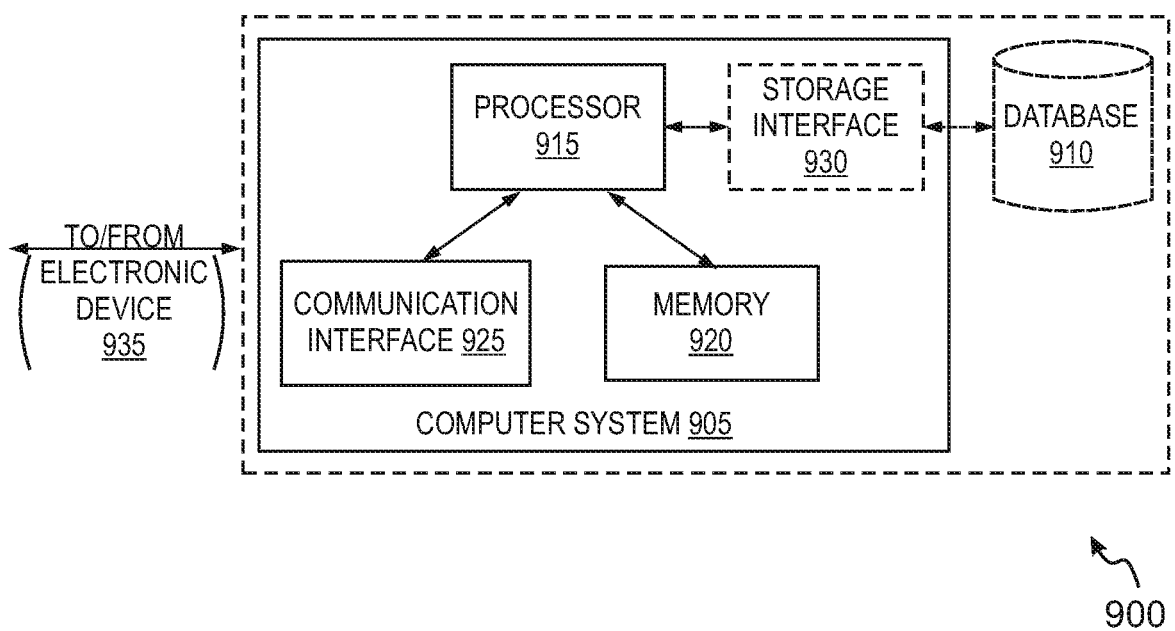
FIG. 9 is a block diagram of a server system, in accordance with an example embodiment of the present disclosure.

It is noted that the instructions (or the executable code) configuring the platform generation application 110 are stored in a memory of the server 108 and the instructions are executed by a processor (for example, a single-core or a multi-core processor) included within the server 108, as is exemplarily shown with reference to FIG. 9. Accordingly, even though the various functionalities for creating a location-based information sharing platform are explained with reference to or being performed by the platform generation application 110, it is understood that the processor in conjunction with the code in the memory is configured to execute the various tasks as enabled by the instructions of the platform generation application 110.

The various components of the platform generation application 110 are further explained with reference to FIG. 2.

Figure 2:
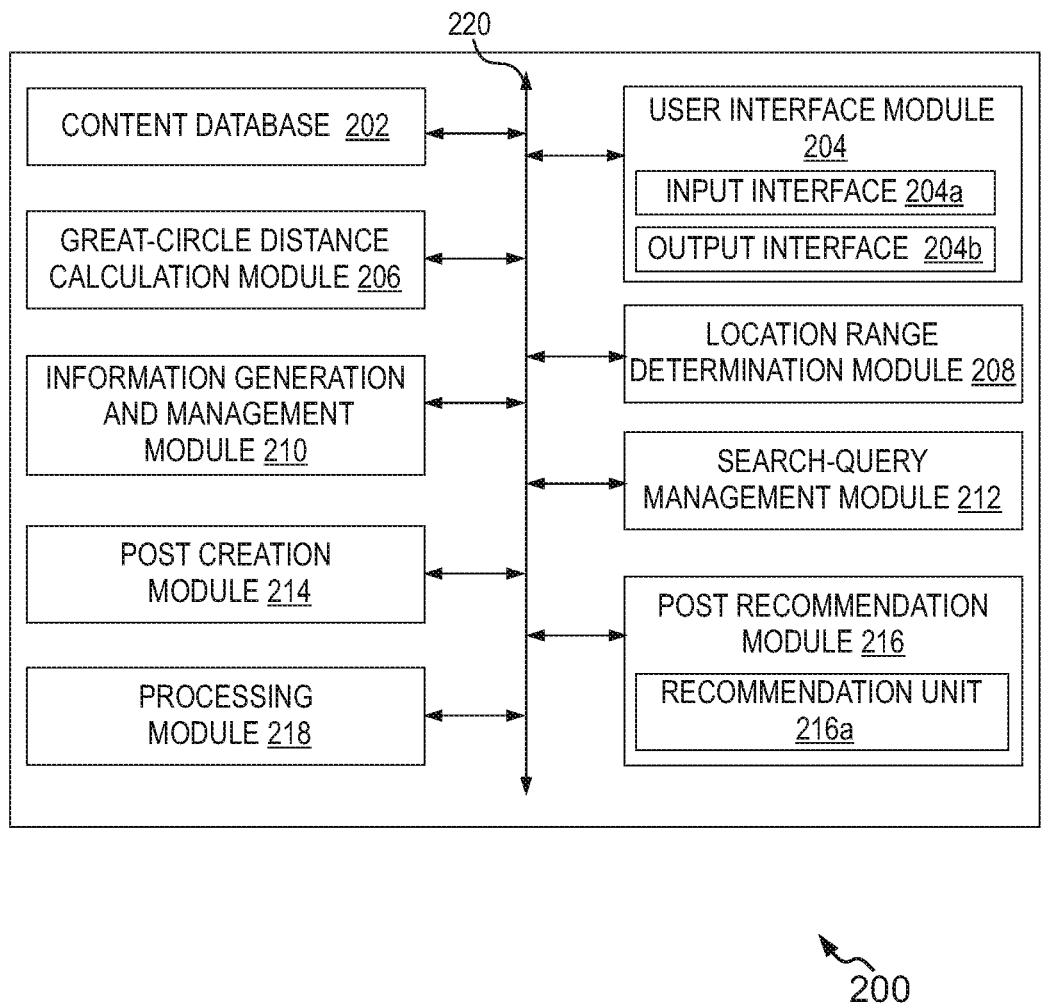
FIG. 2 is a block diagram of a system for creating a location-based information sharing platform, in accordance with an example embodiment.

FIG. 2 is a block diagram of a system 200 for creating a location-based information sharing platform, in accordance with an example embodiment. The system 200 is configured to obtain location coordinates of a user device (e.g., the user device 104) and to deliver information that is within the given range on a UI facilitated by the platform creation application installed on the user device. In an embodiment, the system 200 includes a content database 202, a user interface (UI) module 204, a great-circle distance calculation module 206, a location range determination module 208, an information generation and management module 210, a search-query management module 212, a post creation module 214, a processing module 216 and a centralized circuit system 218.

The content database 202 is configured to store data regarding items of interest in a categorized manner. Basically, the data regarding items of interest is stored under a plurality of category tags or a plurality of sub-category tags of the plurality of category tags that are pre-created in the content database 202. In an embodiment, the plurality of category tags and the plurality of sub-category tags are created by one or more administrators managing the content database 202. The content database 202 is also configured to store post content included in one or more posts created by one or more users (e.g., the user 102). Further, the content database 202 is configured to store profile information associated with each user of the one or more users. The profile information includes, but is not limited to, user identification (ID), user name, user location, user interests etc.

The UI module 204 is in communication with the content database 202. The UI module 204 is configured to present one or more UIs for facilitating creation of a location-based information sharing platform for sharing information based on a location of a user. The UI module 204 includes an input interface 204a and an output interface 204b. The input interface 204a is configured to receive access permission from the one or more users for accessing location coordinates of location associated with user devices of each user. The input interface 204a is also configured to receive profile information associated with each user. Further, the input interface 204a is also configured to receive requests for creation of a post from the users of the system 200. Additionally, the input interface 204a is configured to receive search queries for viewing relevant content from the users. Examples of the input interface 204a may include but are not limited to, a keyboard, a mouse, a joystick, a keypad, a touch screen, soft keys, a floppy disk, a pen drive, a hard drive and the like. The output interface 204b is configured to facilitate access of the retrieved information to the users of the system 200. In an embodiment, the output interface 204b is configured to display the retrieved information to the user. The output interface 204b is also configured to display relevant data as requested by the users through the search queries. Further, the output interface 204b is configured to display post recommendations to the user. Examples of the output interface 204b may include, but are not limited to, a display such as a light emitting diode (LED) display, a thin-film transistor (TFT) display, a liquid crystal display, an active-matrix organic light-emitting diode (AMOLED) display, and the like.

The great-circle distance calculation module 206 in communication with the UI module 204. The great-circle distance calculation module 206 is configured to calculate great-circle distances between a plurality of points and the location of each user using the location coordinates of the corresponding user. The great-circle distance/orthodromic distance is the shortest distance between two points on the surface of a sphere, and is measured along the surface of the sphere (as opposed to a straight line through the sphere's interior). The plurality of points represents location coordinates of items of interests near the location of the corresponding user on the sphere i.e. earth.

The location range determination module 208 in communication with the great-circle distance calculation module 206 and the UI module 204. The location range determination module is configured to determine range information of the location of each user based on the calculated great-circle distances for the corresponding user. The range information includes a plurality of range coordinates that lies on the sphere.

The information generation and management module 210 is in communication with the location range determination module 208 and the content database 202. The information generation and management module 210 is configured to query the content database 202 for each user based on the range information of the location of the corresponding user to retrieve information lying within a range of the location in the content database 202. The information generation and management module 210 may send a query to the content database 202 using the plurality of range coordinates to retrieve information that is lying within the plurality of range coordinates from the data that is available in the content database 202 as each post is stored in the content database 202 along with location coordinates. The information includes one or more of historical information regarding the location, crime reports and news, sales and promotions by local businesses, advertisements by corporations, job openings and requirements in the range of the location, dining experiences and reviews of eateries in the range of the location, details of events happening in the range of the location and photos and videos of the events. The contents of the information are stored under the one or more sub-category tags of the plurality of sub-category tags and/or the one or more category tag of the plurality of category tags in the content database 202.

The search-query management module 212 in communication with the information generation and management module 210 and the UI module 204. The search-query management module 212 is configured to manage one or more search queries received from each user of the one or more users. Each search query includes one or more search tags. For example, if a user is searching for historical facts, he/she may use search tags such as historical facts, history etc., to search for relevant information. The search-query management module 212 is configured to maintain search history for each user based on the search queries received from each user.

For each search query, the search-query management module 212 is first configured to determine at least one sub-category tag and/or at least one category tag associated with the contents included in the information that are matching with the one or more search tags received for the corresponding search query. For example, the information may include some content that may belong to sales category tag, some content may belong to historical facts category tag and some content may belong to circus sub-category tag under the event category tag. So, as the user is looking for historical facts, the search-query management module 212 will check whether search tags, such as historical facts, history are matching with any of the tags (e.g., the sales category tag, historical facts category tag, circus sub-category tag) that are included in the retrieved information and may find that the historical facts category tag is matching with the historical facts search tag. Once the at least one sub-category tag and/or at least one category tag is determined, the search-query management module 212 is configured to collect content included in the determined at least one sub-category tag and/or the at least one category tag to create relevant data for the user. As discussed in above example, the content included in the historical facts search tag will be collected as the relevant data for the user. Further, the search-query management module 212 is configured to display the relevant data to the user.

The post creation module 214 is in communication with the UI module 204 and the content database 202. The post creation module 214 is configured to create a post for the user based on a request received from the corresponding user for creation of the post. The request for the post may include post content, location information of the user and time information. The post content may include a category tag and a sub-category tag to which the post may belong and description content that needs to be included in the category tag. For example, the user may want to create a post for selling a house, so the category tag for the post can be 'sell', sub-category tag for the post can be 'house' and the description content may include description about the house like '2bhk house with 2 baths' etc. The location information may include location coordinates of the house that the user wants to sell and the time information may include timing of the creation of the post. The post creation module 214 is also configured to store the post in the content database 202 along with the location coordinates of the location for which the post is created.

Further, the post creation module 214 is configured to manage one or more comments received on the post sharing. The post creation module 214 is also configured to manage sharing of the post with other users.

The post recommendation module 216 is in communication with the search-query management module 212, the UI module 204 and the content database 202. The post recommendation module 216 is configured to generate post recommendations for the user based, at least on, the profile information and the search history maintained for the user. The post recommendation module 216 is also configured to facilitate display of the post recommendations to the user. The post recommendation module 216 may include a recommendation unit 216a that is designed to understand user behaviour and to predict user preferences based on the user behavior.

In an embodiment, the recommendation unit 216a may use statistical machine learning models, such as content based filtering machine learning algorithms and subsequently collaborative filtering machine learning algorithms for generating post recommendations. In another embodiment, the recommendation unit 216a may use deep learning based models, such as linear and logistic regression models, three-layer feed forward neural network, loss functions etc., for generating post recommendations. In yet another embodiment, the recommendation unit 216a may use deep learning recommendation model (DLRM) or neural magic for generating post recommendations.

The processing module 218 is in communication with the content database 202, the UI module 204, the great-circle distance calculation module 206, the location range determination module 208, the information generation and management module 210, the search-query management module 212, the post creation module 214 and the post recommendation module 216. The processing module 218 is configured to send operating instructions to the content database 202, the UI module 204, the great-circle distance calculation module 206, the location range determination module 208, the information generation and management module 210, the search-query management module 212, the post creation module 214 and the post recommendation module 216 for facilitating creation of the location-based information sharing platform for sharing information based on the location of the user stored in the system 200. Further, the processing module 218 is configured to manage user profile of each user.

The content database 202, a user interface (UI) module 204, a great-circle distance calculation module 206, a location range determination module 208, an information generation and management module 210, a search-query management module 212, a post creation module 214, the post recommendation module 216 and the processing module 218 may be configured to communicate with each other via or through the centralized circuit system 220. The centralized circuit system 220 may be various devices configured to, among other things, provide or enable communication between the modules (202-218) of the system 200. In certain embodiments, the centralized circuit system 220 may be a central printed circuit board (PCB) such as a motherboard, a main board, a system board, or a logic board. The centralized circuit system 220 may also, or alternatively, include other printed circuit assemblies (PCAs) or communication channel media. In some embodiments, the centralized circuit system 220 may include appropriate storage interfaces to facilitate communication among the modules (202-218). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3:
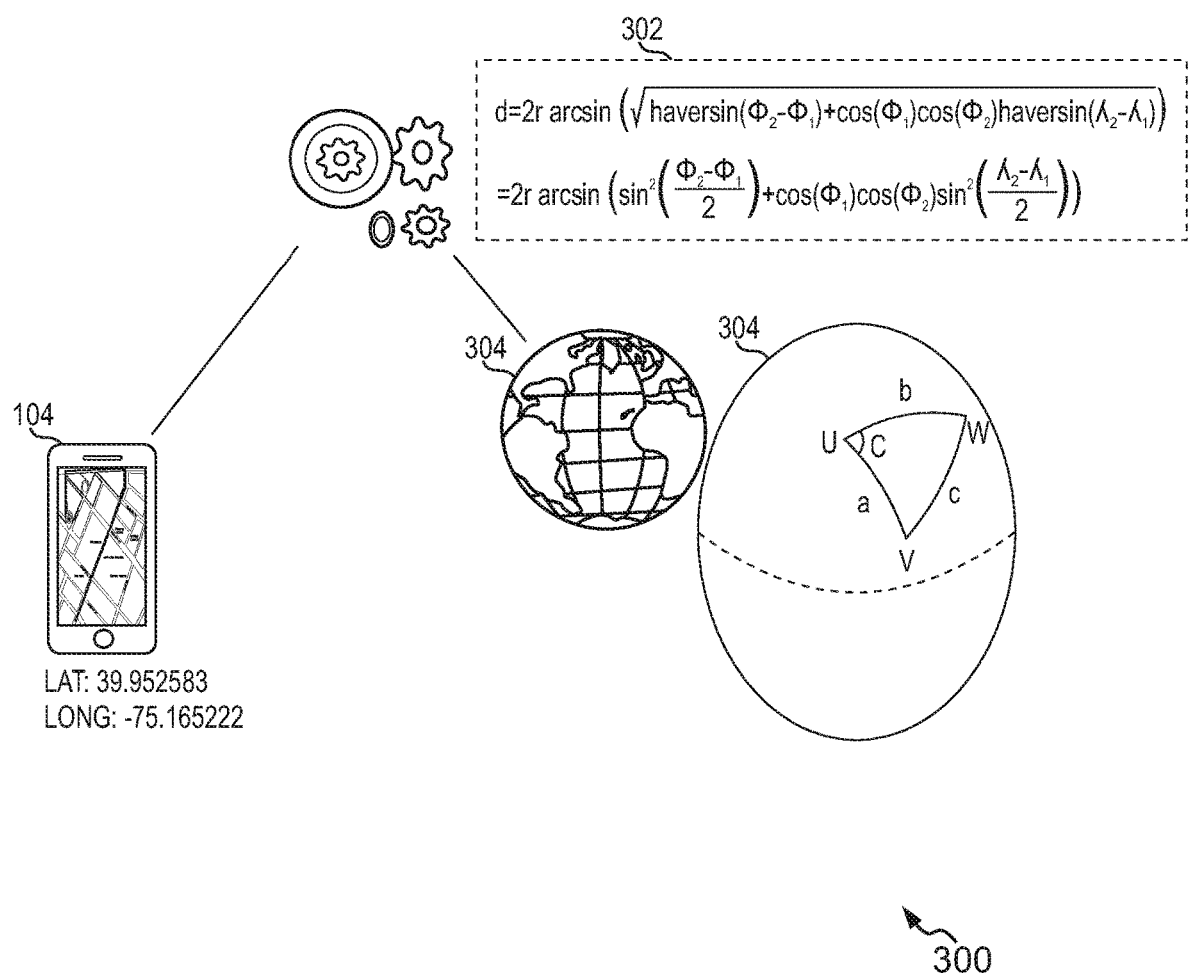
FIG. 3 is an example representation showing calculation of great-circle distance using a haversine formula, in accordance with an example embodiment.

FIG. 3 is an example representation 300 showing calculation of great-circle distance using a haversine formula 302, in accordance with an example embodiment. The user device 104 is shown to be tracking location coordinates of a current geographical location. The user device 104 may include necessary hardware and software that may be required for tracking location of the user device 104. The location coordinates are shown to be defined in terms of latitude and longitude.

The tracked location coordinates are then shared with a server (e.g., the server 108) using a network (e.g., the network 106). The server may then apply the haversine formula 302 on the tracked location coordinates i.e. latitude and longitude. The haversine formula 302 is as follows:

$$d = 2r \arcsin\left(\sqrt{haversin(\emptyset_2 - \emptyset_1) + \cos(\emptyset_1)\cos(\emptyset_2)haversin(\lambda_2 - \lambda_1)}\right) =$$
$$2r \arcsin\left(\sqrt{\left(\sin^2\frac{\emptyset_2 - \emptyset_1}{2} + \cos(\emptyset_1)\cos(\emptyset_2)\sin^2\frac{\lambda_2 - \lambda_1}{2}\right)}\right)$$

Where,
'd' represents distance between the two points along a great circle of a sphere,
'r' represents radius of the sphere,
$\emptyset_1, \emptyset_2$ are the latitude of point 1 and point 2 (in radians),
$\lambda_1, \lambda_2$ are the longitude of point 1 and point 2 (in radians).

The haversine formula 302 determines the great-circle distance between two points on a sphere 304 i.e. earth for the given longitudes and latitudes using a law of haversines. The calculated great-circle distance may be used to determine a range information for the location that is further used against data stored in a content database (e.g., the content database 112) to retrieve information lying within a range of the location. Subsequently, only the retrieved information is shared back to the user device 104.

Figure 4:
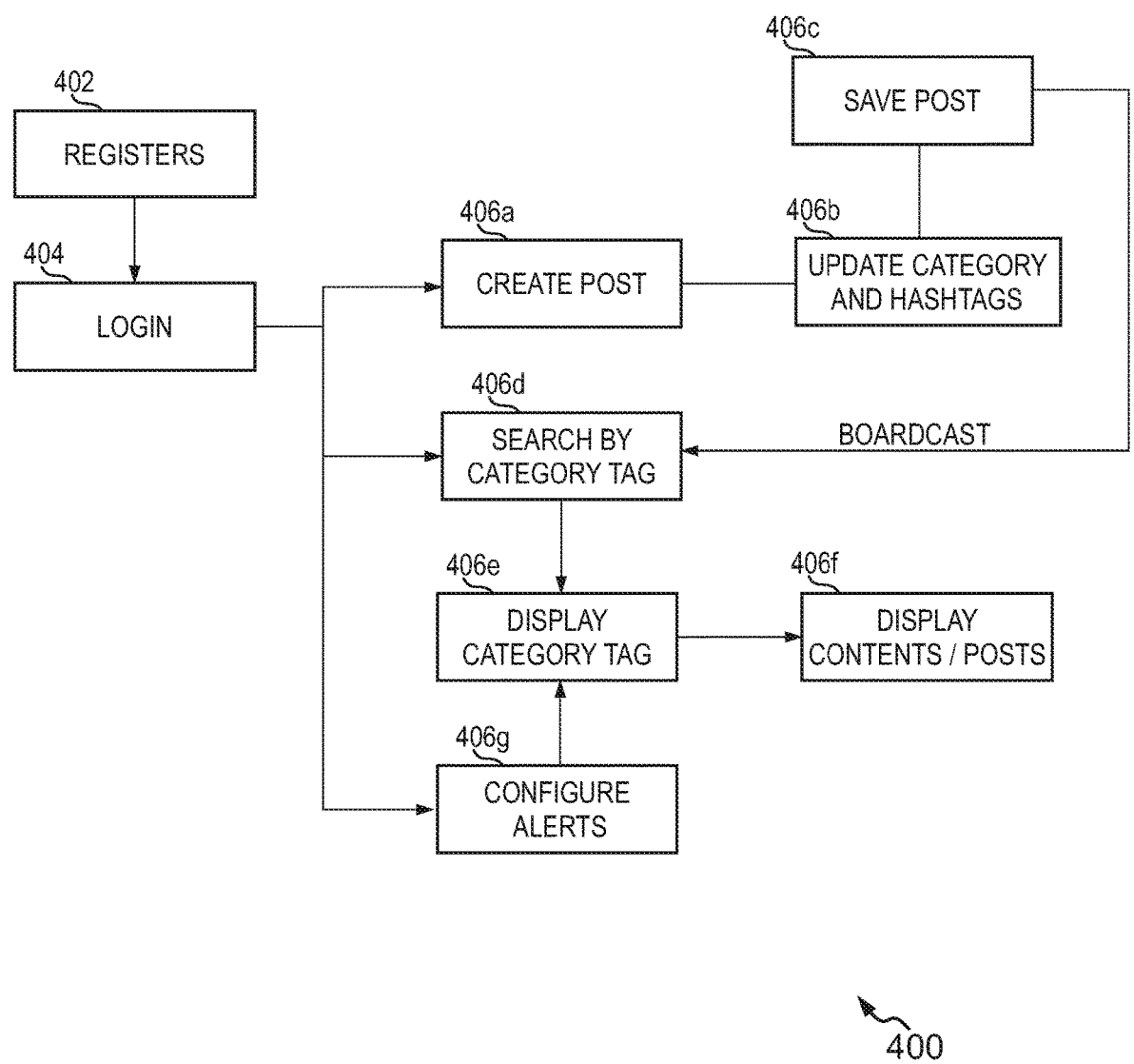
FIG. 4 is a flow diagram for using a platform generation application, in accordance with an example embodiment.

FIG. 4 is a flow diagram 400 for using the platform generation application 110, in accordance with an example embodiment. The operations of the flow diagram 400 may be carried out by the system 200 or by the server 108. The sequence of operations of the flow diagram 400 may not to be necessarily executed in the same order as they are presented. Further, one or more operations may be grouped together and performed in form of a single step, or one operation may have several sub-steps that may be performed in parallel or in sequential manner At operation 402, a user needs to register with the platform generation application 110. The user may be required to provide profile information such as user identification (ID), user name, user location, password, interests etc., for registering with the location-based information sharing platform.

At operation 404, once the user is registered with the platform generation application 110, the user can log in the platform generation application 110 using the user ID and password.

At operation 406, after successful login, the user will be displayed a UI (shown in FIG. 7A) where the user can mainly perform three operations i.e. create post 406a, perform search 406d and configure alerts 406g.

At operation 406a, the user can create a post by providing post content. The post content may include a category tag and a sub-category tag to which the post may belong and description content that needs to be included in the category tag. The sub-category tag is optional. In an embodiment, the category tags and a sub-category tags may be provide in form of hash tags. Once the post is created for the user, one or more posts that are included in the defined category tag and the sub-category tag are updated 406b to include the created post. For example, 'opening' category tag may already have '3' posts showing different openings at different locations, so if the user has also created a post under the 'opening' category tag, the category tag will be updated to include the created post.

After the category tag is updated, the created post is saved 406c in the updated category tag. So, now '4' posts will be shown in the 'opening' category tag. Further, the new post is broadcasted to every user who has configured alert for the same category tag i.e. the 'opening' category tag.

At operation 406d, the user can perform a search by providing one or more search tags in which the user is interested. Each search tag will be matched with already defined category tags/sub-category tags to determine matching one or more category tags/sub-category tags. The matching one or more category tags/sub-category tags are then displayed 406e to the user and the user can select any category tag or sub-category tag as per his/her choice. The contents/posts included in the selected category tag will then be displayed 406f to the user.

At operation 406g, the user can configure alerts for some selected category tags/sub-category tags in which the user is interested. Once the user chooses to configure alerts, the already defined category tags/sub-category tags are displayed to the user. The user can select one or more category tags/sub-category tags from the already defined category tags/sub-category tags and the alerts for the selected one or more category tags/sub-category tags will be sent to the user.

Figure 5:
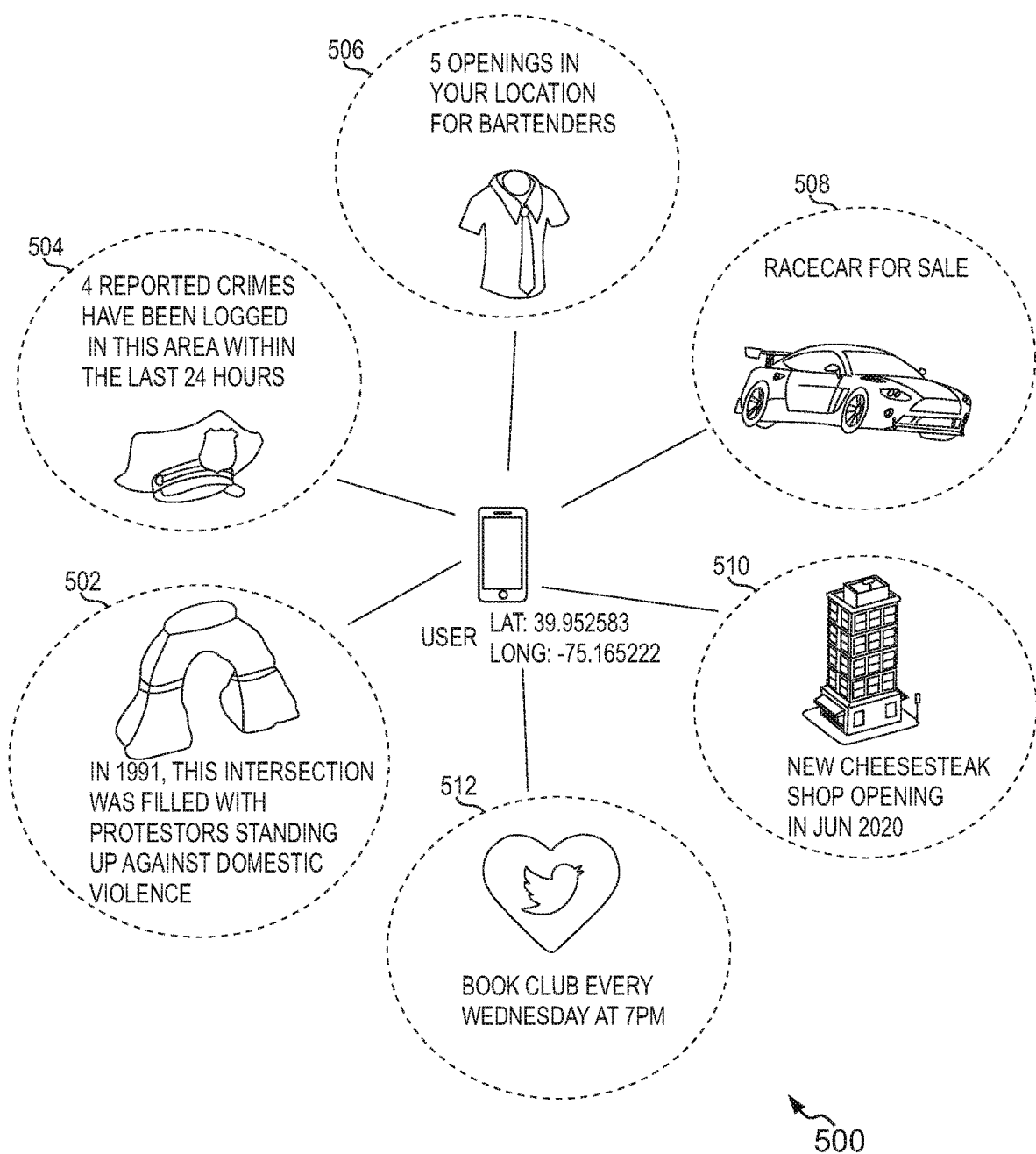
FIG. 5 is an example representation of information displayed to a user based on location coordinates received from a user device, in accordance with another example embodiment.

FIG. 5 is an example representation of information displayed to a user based on location coordinates received from a user device (e.g., the user device 104), in accordance with an example embodiment. The user device is shown to be at location whose coordinates are latitude-39.952583 and longitude-75.165222. The information displayed to the user based on the location includes historic information 502 about the location, crime reports 504 describing crimes that have happened recently in a range of the location, job openings 506, sales advertisement 508 for selling a race car in the range of the location, new restaurants opening intimation 510, and a notification of book event organized by a social network platform 512.

Figure 6:
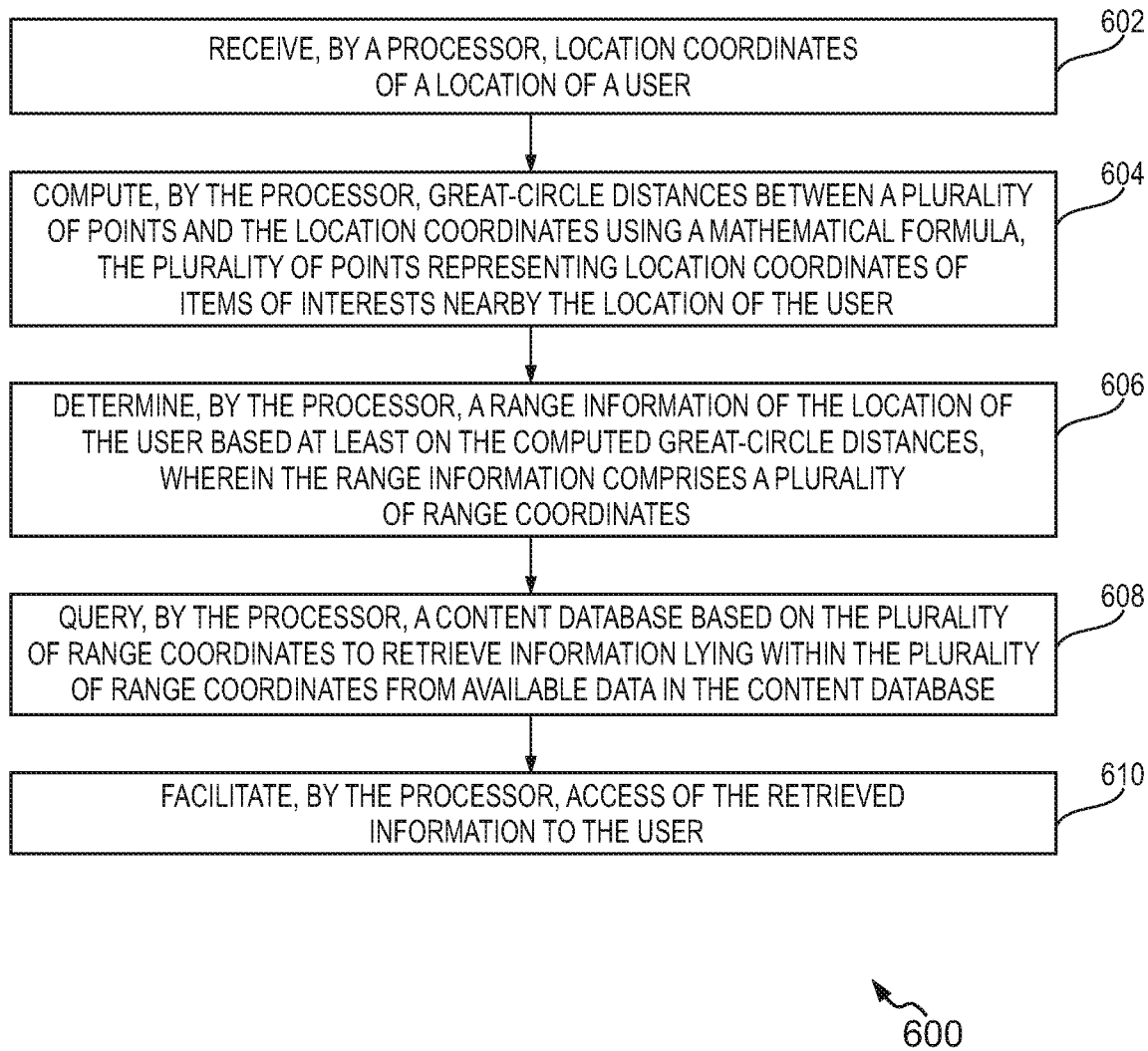
FIG. 6 is flowchart illustrating a method for creating a location-based information sharing platform, in accordance with an example embodiment.

FIG. 6 is a flowchart illustrating a method 600 for creating a location-based information sharing platform, in accordance with an example embodiment. The operations of the method 600 may be carried out by the server 108 or the system 200. The sequence of operations of the method 600 may not to be necessarily executed in the same order as they are presented. Further, one or more operations may be grouped together and performed in form of a single step, or one operation may have several sub-steps that may be performed in parallel or in sequential manner.

At operation 602, the method 600 includes receiving, by a processor, a location coordinates of a location of a user (e.g., the user 102). The location coordinates of a current geometric location associated with the user are tracked by a user device (e.g., the user device 104) associated with the user. The tracked location coordinates are then provided to the processor.

At operation 604, the method 600 includes computing, by the processor, great-circle distances between a plurality of points and the location coordinates using a mathematical formula. The plurality of points represents location coordinates of items of interests near the location of the user. In an embodiment, the mathematical formula is the haversine formula. The haversine formula uses longitudes and latitudes of the two points to determine the great-circle distance between the two points. The great-circle distance is the shortest distance between two points on the surface of a sphere, such as earth.

At operation 606, the method 600 includes determining, by the processor, range information of the location of the user based at least on the computed great-circle distances. The range information includes a plurality of range coordinates that can lie in different direction from the location of the user.

At operation 608, the method 600 includes querying, by the processor, a content database based on the plurality of range coordinates to retrieve information lying within the plurality of range coordinates from available data in the content database. The content database is queried based on the plurality of range coordinates to retrieve information that is lying within a range of the location of the user as the data in the content database is stored along with the location coordinates. So, from a plurality of posts that are stored in the content database, one or more posts whose location is coming under the range of the location of the user are retrieved from the content database.

At operation 610, the method 600 includes facilitating, by the processor, access of the retrieved information to the user. The information that is retrieved by querying the database is displayed to the user. The information includes, but are not limited to, historical information regarding the location, crime reports and news, sales and promotions by local businesses, advertisements by corporations, job openings and requirements in the range of the location, dining experiences and reviews of eateries in the range of the location, details of events happening in the range of the location, photos and videos/live videos of the events etc.

Figure 7A:
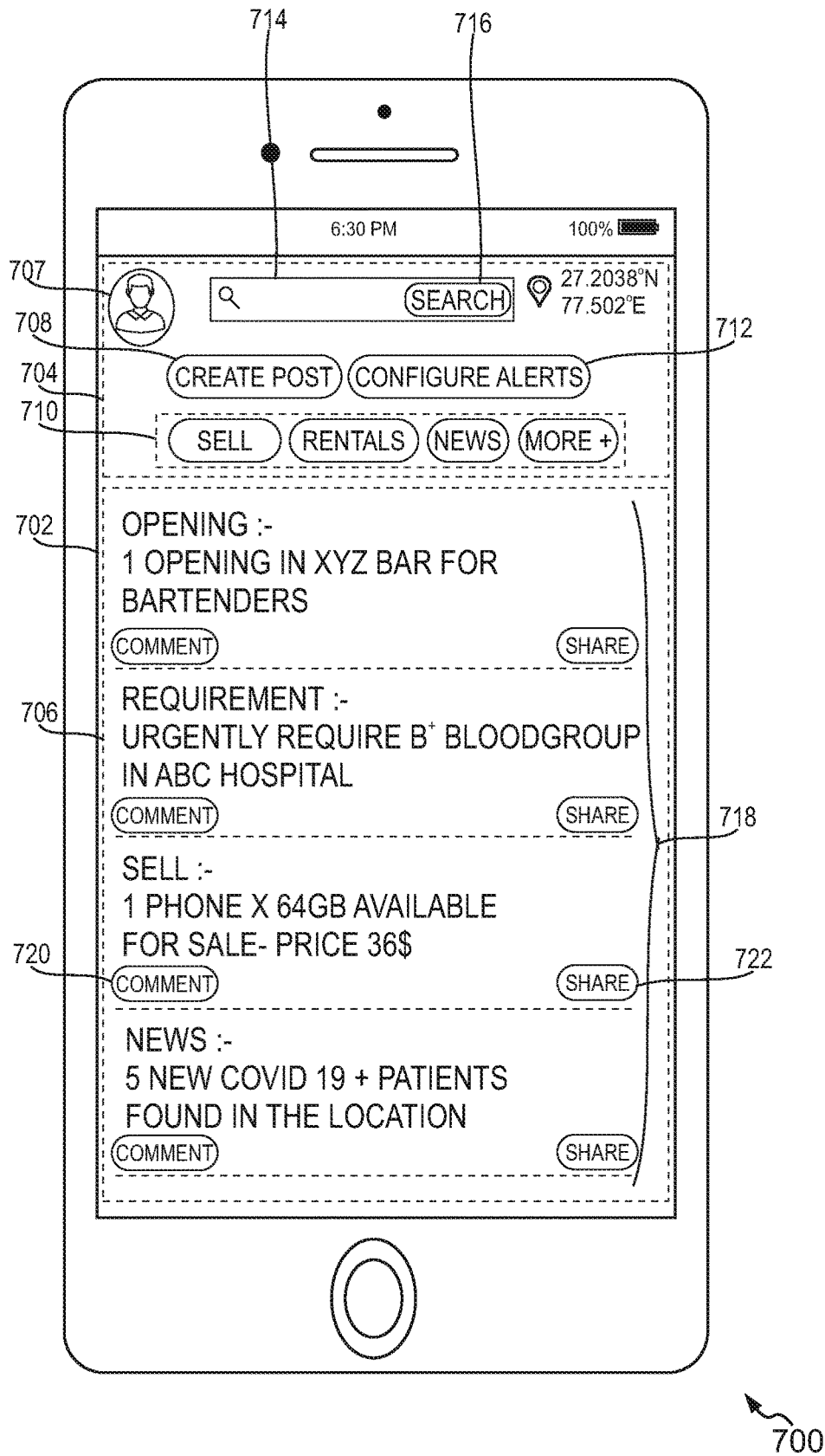
FIG. 7A is an example representation of a user interface (UI) depicting an information page displayed to the user, in accordance with an example embodiment.

FIG. 7A is an example representation of a user interface (UI) 700 depicting an information page 702 displayed to a user, such as the user 102 of the platform generation application 110, in accordance with an example embodiment. The UI 700 is presented on a user device, such as the user device 104 shown in FIG. 1. In an embodiment, the user may be required to register first with the platform generation application 110 by providing an e-mail id or a contact number for using the platform generation application 110.

The information page 702 includes a top section 704 and a bottom section 706. The top section 704 includes a profile icon 707, create post icon 708, a plurality of category tag icons 710, a configure alert icon 712, a location icon displaying the current location of the user and a search field 714. The bottom section 706 includes a list of posts 718 that are retrieved from a content database (e.g., the content database 112) based on the current location of the user.

The user can click on the profile icon 707 for updating the profile information associated with the user. Clicking on the profile icon 707 may redirect the user to an update profile page where the user can update the profile information. Further, the user can click on the create post icon 708 if the user is interested in creating some post. Clicking on the profile icon 707 may redirect the user to a post page 752. The post page is discussed in detail with reference to FIG. 7B.

The user can click on any category icon from the plurality of category tag icons 710 for viewing posts related with the corresponding category icon. The user can configure alerts for certain categories by clicking on the configure alert icon 712. Clicking on configure alert icon 712 may display predefined category tags and sub-category tags within the category tags. The user can select one or more category tags/sub-category tags from the displayed category tags and sub-category tags. Once the category tag selection is done, the user will start receiving notifications for any update performed on the selected category tags. The search field 714 can be used by the user to generate a search query for viewing data relevant to the user. The user may write some search tags in the search field 714 and then click on a search button 716. Clicking on the search button may display the relevant data to the user.

Each post in the list of posts 718 includes a comment tab 720 and a share tab 722. Clicking on the comment tab 720 of a post may present a comment box that can be used by the user to write a comment on the respective post. Clicking on the share tab 722 of the post may provide the options to share the content on other social media platforms like Twitter™, Facebook™, WhatsApp™ as well as to share the content as email and/or a text message to those who have a valid mail account and a valid phone carrier.

Figure 7B:
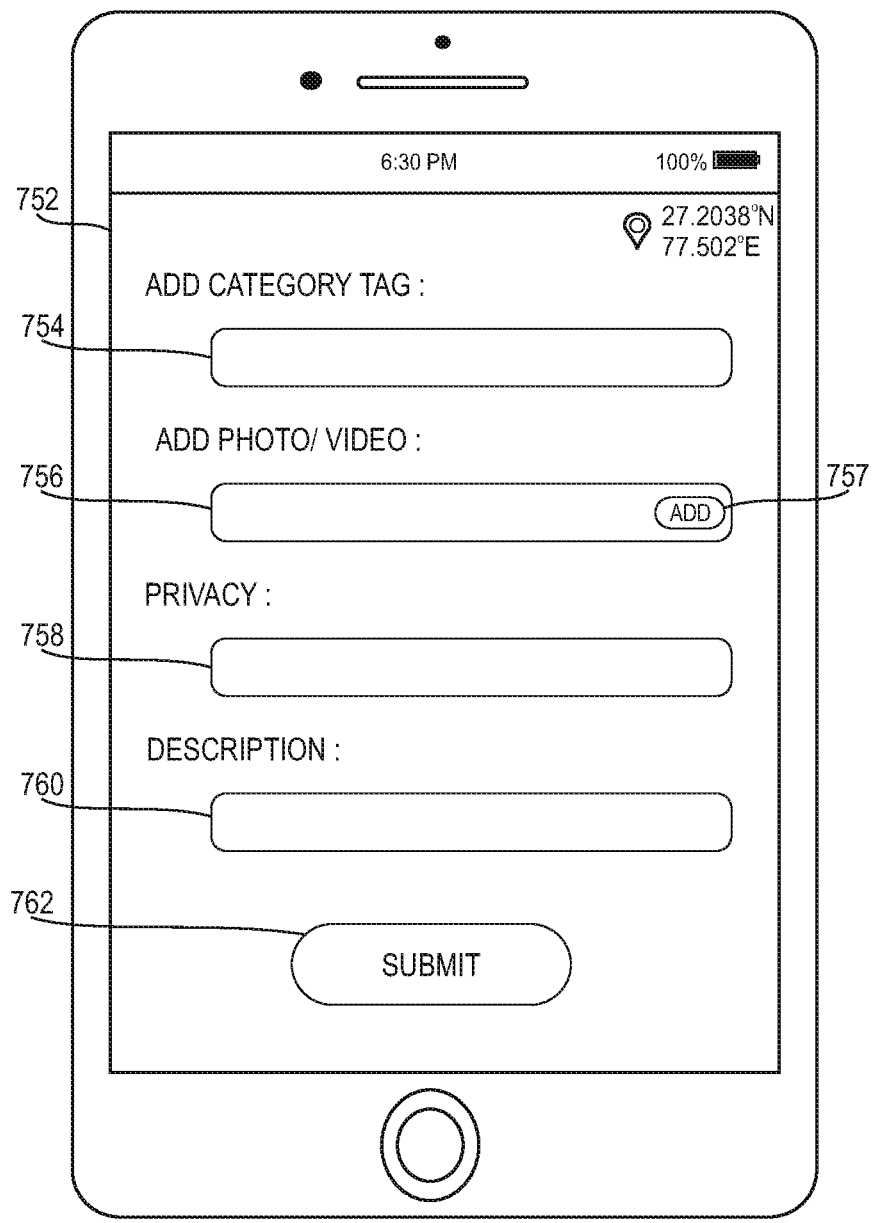
FIG. 7B is an example representation of the UI depicting a post page displayed to the user, in accordance with an example embodiment.

FIG. 7B is an example representation of a UI 750 depicting the post page 752 displayed to a user, such as the user 102 of the platform generation application 110, in accordance with an example embodiment. The UI 750 is presented on a user device, such as the user device 104 shown in FIG. 1.

The post page 752 includes a category tag field 754, a photo/video field 756, a privacy field 758, a description field 760 and a submit button 762. The post page 752 also displays the location coordinates of current location of the user device in which the platform generation application 110 is installed.

The category tag field 754 can be used by the user to provide a general category to which the post may belong. The photo/video field 756 includes an add tab 757. The user can click on the add tab 757 to add a photo or a video that the user wants to put as a profile photo/video for the post.

The privacy field 758 can be used by the user to provide privacy details of the post. The user can make the post private or can grant access to specific groups of a particular region or can simply turn off the broadcast of post content included in the post to other nearby users. The user can provide the post content in the description field 760. The user may click on the submit button 762 to submit the information provided in the post page 752. Once the user clicks the submit button 762, the information provided in the post page 752 will be saved in the content database 112 along with the location coordinates and a timestamp. The timestamp may indicate the time of creation of the post.

Figure 8:
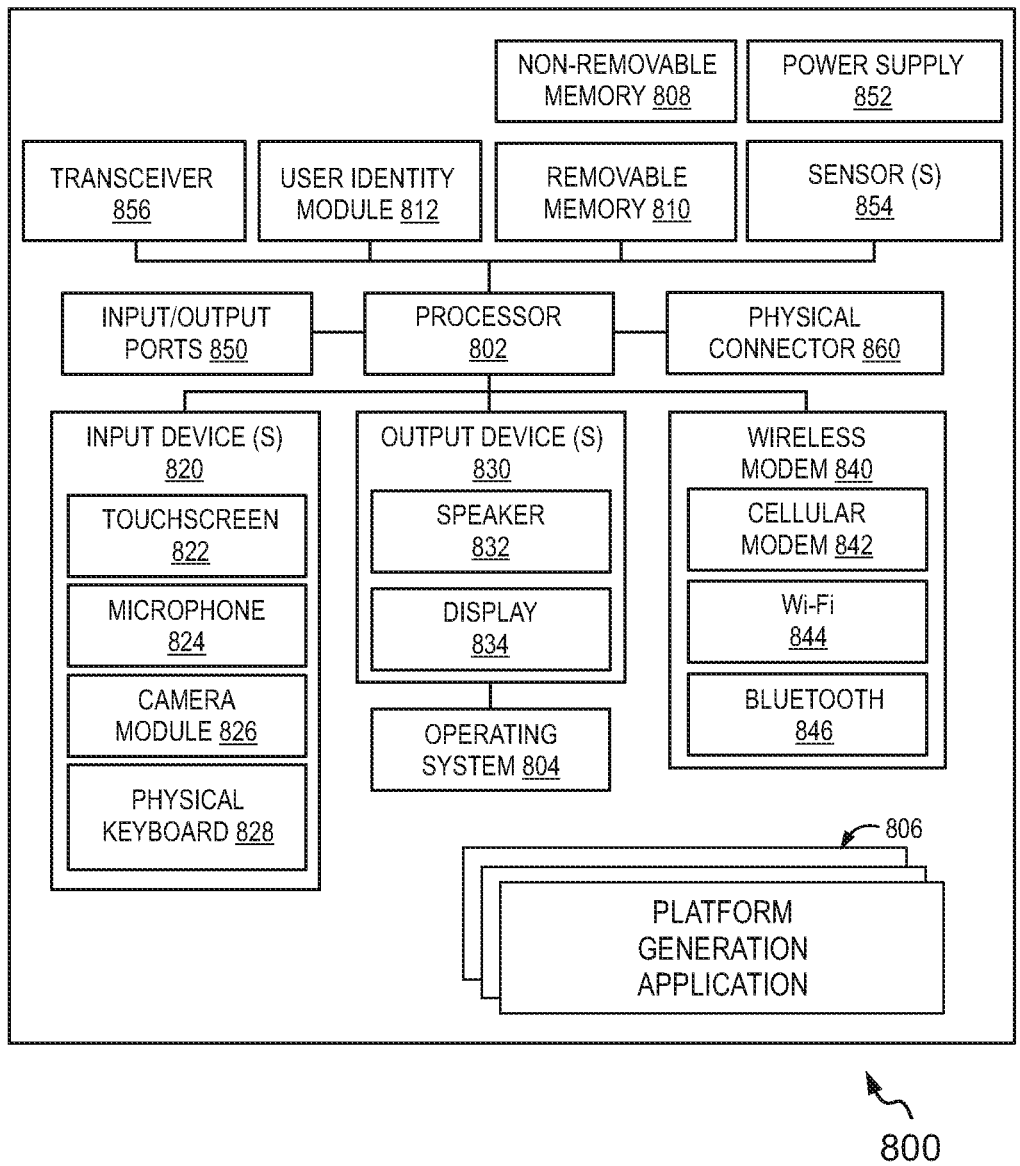
FIG. 8 is a block diagram of an electronic device capable of implementing the various embodiments of the present disclosure, in accordance with an example embodiment.

FIG. 8 shows a simplified block diagram of an electronic device 800 capable of implementing the various embodiments of the present disclosure. The electronic device 800 may be an example of the electronic device 104. It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an example embodiment may include more, less or different components than those described in connection with the example embodiment of the FIG. 8. As such, among other examples, the electronic device 800 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and provides support for one or more program, such as the platform generation application that implements one or more of the innovative features described herein. The applications 806 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 800 includes one or more memory components, for example, a non-removable memory 808 and/or a removable memory 810. The non-removable memory 808 and/or the removable memory 810 may be collectively known as storage device/module in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited, to a speaker 832 and a display 834. Other possible output devices can include piezoelectric or other haptic output devices.

Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 for example, an accelerometer, a gyroscope, a compass, or an infrared proximity sensor for detecting the orientation or motion of the electronic device 800, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 8, or one or more operations of the method 600 and the flow diagram 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 9 is a simplified block diagram of a server system 900, in which the platform generation application 110 is provided, in accordance with one embodiment of the present disclosure. The server system 900 is an example of the server 108 shown and explained with reference to FIG. 1. The server system 900 includes a computer system 905 and one or more databases, such as a database 910.

The computer system 905 includes a processor 915 for executing instructions. Instructions may be stored in, for example, but not limited to, a memory 920. The processor 915 may include one or more processing units (e.g., in a multi-core configuration). The processor 915 is operatively coupled to a communication interface 925 such that the computer system 905 is capable of communicating with a remote device such as an electronic device 935. Example of the electronic device 935 may include, but is not limited to, the electronic device 104, shown in FIG. 1.

The processor 915 may also be operatively coupled to the database 910. In an embodiment, the database 910 is the content database 112. The database 910 is configured to store data regarding items of interest in a categorized manner as explained with reference to FIGS. 1 to 8. The database 910 is any computer-operated hardware suitable for storing and/or retrieving data. The database 910 may include multiple storage units such as hard disks and/or solid-state disks in a redundant array of inexpensive disks (RAID) configuration. The database 910 may include, but not limited to, a storage area network (SAN) and/or a network attached storage (NAS) system.

In some embodiments, the database 910 is integrated within the computer system 905. For example, the computer system 905 may include one or more hard disk drives as the database 910. In other embodiments, the database 910 is external to the computer system 905 and may be accessed by the computer system 905 using a storage interface 930. The storage interface 930 is any component capable of providing the processor 915 with access to the database 910. The storage interface 930 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 915 with access to the database 910.

The memory 920 is a storage device embodied as one or more volatile memory devices, one or more non-volatile memory devices, and/or a combination of one or more volatile memory devices and non-volatile memory devices, for storing micro-contents information and instructions. The memory 920 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for creating a location-based information sharing platform. The system provides historical facts of a given location, past future trending events of a given location, local news by local businesses and law enforcement of a given location, as well as give users the opportunity to create an environment to share information of a given location (for instance, applicant looking for a job, or a business looking to hire, or a user simply wanting to share information about a night event that he had enjoyed and so on), thereby facilitating sharing of valuable information without having to print fliers which further reduces their ecological footprint by reducing paper wastage. The system allows user to view only relevant content based on the location of the user, thereby reducing the unwanted information which further saves phone memory and battery power.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory medium or means that can contain, store, communicate, propagate or transport the instructions for use by or in connection with an instruction execution system, apparatus, or device, such as a computer. A computer-readable medium may include a computer-readable storage medium that may be any medium or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application and\or implementation without departing from the spirit or scope of the claims.

What is claimed is:

1. A method, comprising:
    receiving, by a processor, location coordinates of a location of a user;
    computing, by the processor, great-circle distances between a plurality of points and the location coordinates using a mathematical formula, the plurality of points representing location coordinates of items of interests near the location of the user;
    determining, by the processor, a range information of the location of the user based at least on the computed great-circle distances, wherein the range information comprises a plurality of range coordinates;
    querying, by the processor, a content database based on the plurality of range coordinates to retrieve information lying within the plurality of range coordinates from available data in the content database; and
    facilitating, by the processor, access of the retrieved information to the user.

2. The method as claimed in claim 1, wherein facilitating the access of the retrieved information to the user comprises:
    displaying, by the processor, the information to the user.

3. The method as claimed in claim 1, wherein the information includes one or more of:
    historical information regarding the location;
    crime reports and news;
    sales and promotions by local businesses;
    advertisements by corporations;
    job openings and requirements in range of the location;
    dining experiences and reviews of eateries in the range of the location;
    details of events happening in the range of the location; and
    photos and videos or live videos of the events.

4. The method as claimed in claim 1, wherein the available data is stored under a plurality of category tags or a plurality of sub-category tags of the plurality of category tags created in the content database, wherein the plurality of category tags and the plurality of sub-category tags are created by one or more administrators managing the content database.

5. The method as claimed in claim 4, wherein the information comprises contents that are stored under one or more sub-category tags of the plurality of sub-category tags or one or more category tags of the plurality of category tags in the content database.

6. The method as claimed in claim 5, further comprising:
    receiving, by the processor, a search query from the user, the search query comprising one or more search tags;
    determining, by the processor, at least one sub-category tag and/or at least one category tag associated with the contents included in the information that are matching with the one or more search tags;
    creating, by the processor, relevant data by collecting content included in the determined at least one sub-category tag and/or the at least one category tag; and
    displaying, by the processor, the relevant data to the user.

7. The method as claimed in claim 1, further comprising:
    receiving, by the processor, profile information from the user;
    storing, by the processor, the profile information in the content database; and
    maintaining, by the processor, search history for the user based on one or more search queries received from the user.

8. The method as claimed in claim 7, further comprising:
generating, by the processor, post recommendations for the user based, at least on, the profile information and the search history maintained for the user; and
facilitating, by the processor, display of the post recommendations to the user.

9. The method as claimed in claim 1, further comprising:
receiving, by the processor, a request from the user for creating a post, the request comprising post content, location information and time information;
creating, by the processor, the post for the user based, at least in part, on the post content, the location information and the time information, wherein the post comprises a timestamp representing a time of creation of the post and location coordinates included in the location information along with the post content; and
storing, by the processor, the post content, the location coordinates and the time of the creation of the post in the content database.

10. The method as claimed in claim 1, further comprising:
checking, by the processor, whether the location coordinates of the location associated with the user is same or changed;
upon determining that the location coordinates are changed, computing, by the processor, new great-circle distances between a plurality of new points and a new location coordinates using the mathematical formula;
determining, by the processor, new range information of the location of the user based at least on the new great-circle distances, wherein the new range information comprises a plurality of new range coordinates;
querying, by the processor, the content database based on the plurality of new range coordinates to determine new information lying within the plurality of new range coordinates from the available data in the content database; and
facilitating, by the processor, access of the new information to the user.

11. The method as claimed in claim 1, wherein the mathematical formula is a haversine formula.

12. A server system, comprising:
a memory configured to store instructions; and
a processor configured to execute the instructions stored in the memory and thereby cause the server system to perform:
receiving location coordinates of a location of a user;
computing great-circle distances between a plurality of points and the location coordinates using a mathematical formula, the plurality of points representing location coordinates of items of interests nearby the location of the user;
determining a range information of the location of the user based at least on the computed great-circle distances, wherein the range information comprises a plurality of range coordinates;
querying a content database based on the plurality of range coordinates to retrieve information lying within the plurality of range coordinates from available data in the content database; and
facilitating access of the retrieved information to the user.

13. The server system as claimed in claim 12, wherein for facilitating access of the retrieved information to the user, the server system is further caused at least in part to: display the information to the user.

14. The server system as claimed in claim 12, wherein the available data is stored under a plurality of category tags or a plurality of sub-category tags of the plurality of category tags created in the content database, wherein the plurality of category tags and the plurality of sub-category tags are created by one or more administrators managing the content database.

15. The server system as claimed in claim 14, wherein the information comprises content that is stored under one or more sub-category tags of the plurality of sub-category tags or one or more category tags of the plurality of category tags in the content database.

16. The server system as claimed in claim 15, wherein the server system is further caused to:
receive a search query from the user, the search query comprising one or more search tags;
determine at least one sub-category tag and/or at least one category tag associated with the content included in the information that is matching with the one or more search tags;
create relevant data by collecting the content included in the determined at least one sub-category tag and/or the at least one category tag; and
display the relevant data to the user.

17. The server system as claimed in claim 12, wherein the server system is further caused to:
receive a request from the user for creating a post, the request comprising post content, location information and time information;
create the post for the user based, at least in part, on the post content, the location information and the time information, wherein the post comprises a timestamp representing a time of creation of the post and the location coordinates included in the location information along with the post content; and
store the post content, the location coordinates and the time of the creation of the post in the content database.

18. The server system as claimed in claim 12, wherein the server system is further caused to:
check whether the location coordinates of the location associated with the user are same or changed;
upon determining that the location coordinates are changed, compute new great-circle distances between a plurality of new points and a new location coordinates using the mathematical formula;
determine a new range information of a new location of the user based at least on the new great-circle distances, wherein the new range information comprises a plurality of new range coordinates;
query the content database based on the plurality of new range coordinates to determine new information lying within the plurality of new range coordinates from the available data in the content database; and
facilitate access of the new information to the user.

19. A system comprising:
a content database configured to store data regarding items of interest in a categorized manner;
a user interface (UI) module in communication with the content database, the UI module configured to present one or more UIs for facilitating information sharing based on a location of a user;
a great-circle distance calculation module in communication with the UI module, the great-circle distance calculation module configured to calculate great-circle distances between a plurality of points and the location of the user;
a location range determination module in communication with the great-circle distance calculation module and the UI module, the location range determination module configured to determine range information of the location of the user based on the calculated great-circle distances, the range information comprising a plurality of range coordinates;

an information generation and management module in communication with the location range determination module and the content database, the information generation and management module configured to query the content database based on the determined range information of the location to retrieve information lying within the plurality of range coordinates in the content database; and a processing module in communication with the information generation and management module, the location range determination module, the great-circle distance calculation module, the UI module and the content database, the processing module is configured to send operating instructions to the information generation and management module, the location range determination module, the great-circle distance calculation module, the UI module and the content database for facilitating information sharing based on the location of the user.

20. The system as claimed in claim 19, wherein the system further comprises:

a search-query management module in communication with the information generation and management module and the UI module, the search-query management module configured to manage one or more search queries received from the user and to maintain search history for the user based on the one or more search queries received from the user;

a post creation module in communication with the UI module and the content database, the post creation module configured to create a post for the user based on a request received from a corresponding user for creation of the post; and a post recommendation module in communication with the search-query management module, the UI module and the content database, the post recommendation module configured to generate post recommendations for the user based at least on profile information and the search history maintained for the user.

* * * * *